(12) United States Patent
Iwasawa (10) Patent No.: US 7,940,178 B2
(45) Date of Patent: *May 10, 2011

(54) LASER AREA SENSOR

(75) Inventor: Masashi Iwasawa, Otsu (JP)

(73) Assignee: Optex Co., Ltd., Shiga (JP)

( * ) Notice: Subject to any disclaimer, the term of this patent is extended or adjusted under 35 U.S.C. 154(b) by 281 days.

This patent is subject to a terminal disclaimer.

(21) Appl. No.: 12/285,381

(22) Filed: Oct. 3, 2008

(65) Prior Publication Data

US 2009/0091447 A1 Apr. 9, 2009

(30) Foreign Application Priority Data

Oct. 9, 2007 (JP) .................................. 2007-263582

(51) Int. Cl.
*G08B 13/18* (2006.01)
(52) U.S. Cl. ....................................................... 340/557
(58) Field of Classification Search .................. 340/557, 340/518, 541, 545.3; 250/221; 356/3
See application file for complete search history.

(56) References Cited

U.S. PATENT DOCUMENTS

| | | | | |
|---|---|---|---|---|
| 3,623,057 | A * | 11/1971 | Hedin et al. ................... | 340/557 |
| 5,937,092 | A * | 8/1999 | Wootton et al. ............... | 382/192 |
| 7,164,116 | B2 * | 1/2007 | Akagi ............................ | 250/221 |
| 7,760,336 | B2 * | 7/2010 | Iwasawa ........................ | 356/5.01 |
| 2005/0034036 | A1 | 2/2005 | Lages et al. | |
| 2005/0156743 | A1 * | 7/2005 | Gallivan et al. ............... | 340/573.4 |
| 2009/0201489 | A1 * | 8/2009 | Eklund et al. ................. | 356/5.01 |

FOREIGN PATENT DOCUMENTS

| | | |
|---|---|---|
| DE | 196 01 661 | 7/1997 |
| DE | 199 17 509 | 5/2000 |
| DE | 103 13 194 | 10/2004 |
| EP | 1 267 178 | 12/2002 |
| EP | 1 298 454 | 4/2003 |
| EP | 1 443 343 | 8/2004 |
| JP | 07-160956 | 6/1995 |
| JP | 3011121 | 12/1999 |
| JP | 2004-185363 | 7/2004 |

OTHER PUBLICATIONS

European Search Report issued Jan. 28, 2009 in corresponding European Application No. 08253278.9.
Fuerstenberg, K., et al., "Object Tracking and Classification Using Laserscanners—Pedestrian Recognition in Urban Environment", 2001 IEEE Intelligent Transportation Systems Conference Proceedings, Oakland, CA, USA, Aug. 25-29, 2001, pp. 451-453.

* cited by examiner

*Primary Examiner* — Phung Nguyen
(74) *Attorney, Agent, or Firm* — Wenderoth, Lind & Ponack, L.L.P.

(57) ABSTRACT

A laser area sensor includes a laser range finder, a scanning mechanism that changes a measurement direction of the laser range finder, and a distance data acquiring portion that defines a detection area and acquires distance information in each direction in the detection area in a time-series manner, by periodically causing the laser range finder to perform measurement while causing the measurement direction to be changed. The laser area sensor also includes a human body judging portion that extracts a portion that is presumed to correspond to a human body, from among the distance information and judges whether or not the extracted portion matches a human body based on a time-series moving status of the extracted portion, an alert output control portion, a memory, and a DIP switch.

10 Claims, 7 Drawing Sheets

LASER AREA SENSOR

CROSS-REFERENCE TO RELATED APPLICATIONS

This application claims priority under 35 U.S.C. §119(a) on Patent Application No. 2007-263582 filed in Japan on Oct. 9, 2007, the entire contents of which are herein incorporated by reference.

BACKGROUND OF THE INVENTION

1. Field of the Invention

The present invention relates to a laser area sensor that detects, for example, an intruder or the like in the building premises. In particular, the present invention relates to a laser area sensor with improved reliability in detecting an intruder or the like using the laser area sensor.

2. Related Art

Conventionally, as one type of crime prevention apparatuses, a microwave sensor is known that transmits microwaves toward a detection area, and, if an intruder is present in the detection area, receives waves reflected by the intruder and detects the intruder.

Also, a "security system" for detecting an intruder using a laser range finder that adopts laser light as a light source instead of microwaves has been proposed (see Japanese Patent No. 3011121 (hereinafter, referred to as "Patent Document 1"), for example).

This "security system" comprises: a sensor portion that sets a monitored area according to a scanning angle at which two-dimensional scanning is performed with light of an optical range finder, and, if an intruder within the area is detected, outputs distance data and angle data of the intruder; a swivel camera portion that is disposed on an electrically-driven swivel base and swivels in conjunction with the sensor portion; and a control portion that has a function to detect whether or not an intruder is present upon a plurality of successive changes in the distance data or the angle data detected by the sensor portion, calculate the position of the intruder based on the changed distance data and angle data from the sensor portion, swivel the swivel camera portion of the electrically-driven swivel base according to the positional data, and display image data of the intruder on a monitor.

Although slightly different from crime prevention apparatuses or security systems, an "object identifying method using an area sensor" that can accurately identify a pedestrian or the like using laser light also has been proposed (see JP 2004-185363A (hereinafter, referred to as "Patent Document 2"), for example).

According to this "object identifying method using an area sensor", the light reflection time is measured in scanning performed by causing pulsed laser light to be projected by an area sensor comprising a laser sensor to a detection area that includes a walking area in which pedestrians are guided and an area around the walking area, a difference between the reflection time when no object is present and the reflection time when an object is present is obtained for each scanning point, thereby calculating the shape and the size of the object, and a vector obtained by a change in the position of the object in each scanning, and an object that moves in the guide direction in the walking area and an object that moves in a direction cutting across the walking area are identified based on calculated signals.

However, a security system as in Patent Document 1 above has a relatively simple configuration in which it is detected whether or not an intruder is present upon a plurality of successive changes in the distance data or the angle data detected by the sensor portion. Thus, it may be erroneously detected that an intruder is present, for example, when the distance data or the angle data is changed by the swaying of plants in the wind, the entering of objects such as birds or small animals, or other noise factors.

Moreover, according to an object identifying method using an area sensor as in Patent Document 2 above, although the reliability in detecting a human body itself is improved compared with that of Patent Document 1, an area in which a human body is to be detected needs to be determined and set in advance, and thus a suitable surveillance area cannot be easily set according to factors such as an actual installation location and a surveillance purpose.

SUMMARY OF THE INVENTION

It is an object of the present invention to provide a laser area sensor that can easily set a suitable surveillance area in which erroneous detection can be prevented as much as possible, according to factors such as an actual installation location and a surveillance purpose, and can easily set an arbitrary surveillance area.

The present invention is directed to a laser area sensor, comprising: a laser range finder that emits laser light, and measures a distance to an object that is present in a laser light emitting direction based on a period of time for light reflected by the object to return; a scanning mechanism portion that changes a measurement direction of the laser range finder; a distance information acquiring portion that defines a detection area and acquires distance information in each direction in the detection area in a time-series manner, by periodically causing the laser range finder to perform measurement while causing the scanning mechanism portion to change the measurement direction; a human body judging portion that extracts a portion that is presumed to correspond to a human body, from among the distance information acquired by the distance information acquiring portion, and judges whether or not the extracted portion matches a human body based on a time-series moving status of the extracted portion; and a human body detection signal output portion that outputs a human body detection signal when the human body judging portion judges that a human body is present.

With thus configured laser area sensor, the spatial resolution in the detection area can be considerably high, and the distance data is acquired in a time-series manner. Thus, it is possible to considerably accurately identify the position, the size, the shape, and the like of an object based on the distance data, thereby precisely judging, for example, whether or not the object is a human body. Furthermore, even in a case where a plurality of human bodies are present in the detection area, the human bodies also can be individually identified.

Furthermore, in the laser area sensor of the present invention, a configuration may be adopted in which the laser area sensor further comprises an area storage portion in which, with respect to a direction in which a normal measurement distance is a constant distance shorter than the maximum detection distance of the laser range finder, the constant distance is recognized to correspond to a detection area boundary face and stored as detection area information, wherein the human body judging portion has a first operation mode in which judgment is performed regarding a human body in a first region that is determined by the shorter distance of the maximum detection distance and the distance to the detection area boundary face in each direction, based on the detection area information stored in the area storage portion.

With thus configured laser area sensor, in a case where laser light is physically blocked by a building wall face or the like depending on the distance measurement direction, and thus the maximum detection distance is substantially limited, it can be judged whether or not a human body is present only in an actually effective detection area.

Furthermore, in the laser area sensor of the present invention, a configuration may be adopted in which the human body judging portion has a second operation mode in which judgment is performed regarding a human body in a second region obtained by excluding a first band-shaped area that extends along the detection area boundary face and has a first predetermined width, from the first region, based on the detection area information stored in the area storage portion.

Furthermore, the laser area sensor of the present invention may further comprise a switching portion that switches the mode between the first operation mode and the second operation mode. For example, a DIP switch or the like may be provided as the switching portion so that the modes can be switched manually from the outside. Alternatively, an operation mode specifying flag may be provided in the area storage portion, and a value of the operation mode specifying flag may be changed in response to a signal or the like from the outside. Alternatively, a configuration may be adopted in which the first operation mode and the second operation mode are automatically switched.

With thus configured laser area sensor, if there are objects such as trees or hedges in a portion where the boundary of the detection area is determined not by the maximum detection distance but by a building wall face or the like, even when these objects sway in the wind or the like, a situation in which it is erroneously judged that a human body is present is prevented as much as possible, and thus the reliability in detecting a human body is improved.

Furthermore, in the laser area sensor of the present invention, a configuration may be adopted in which the human body judging portion has a third operation mode in which judgment is performed regarding a human body in a first band-shaped area that extends along the detection area boundary face and has a first predetermined width, based on the detection area information stored in the area storage portion. Alternatively, a configuration may be adopted in which the human body judging portion has a fourth operation mode in which judgment is performed regarding a human body in a second band-shaped area that is positioned farther than and next to a first band-shaped area and has a second predetermined width, based on the detection area information stored in the area storage portion, the first band-shaped area extending along the detection area boundary face and having a first predetermined width. Furthermore, a plurality of such operation modes may be prepared so that they can be switched, if necessary.

With thus configured laser area sensor, the optimum human body detection can be performed according to factors such as an actual installation location and a surveillance purpose.

Furthermore, in the laser area sensor of the present invention, a configuration may be adopted in which the human body judging portion has a movement line storing operation mode in which judgment is performed regarding a human body in the first region and a movement line of an object judged to be a human body is stored as a locus, and a fifth operation mode in which judgment is performed regarding a human body in a third region that is determined by a distance to the movement line stored in the movement line storing operation mode in each direction. Furthermore, a configuration may be adopted in which if there is a discontinuous portion in the movement line, the human body judging portion completes the discontinuous portion by interpolation processing, and stores the movement line. A configuration may be adopted in which if a plurality of movement lines are present in the same direction, the human body judging portion stores a movement line with a closer distance in priority to the others.

With thus configured laser area sensor, an arbitrary surveillance area can be easily set according to factors such as an actual installation location and a surveillance purpose. Accordingly, the reliability in detecting a human body can be improved.

DESCRIPTION OF THE PREFERRED EMBODIMENTS

Hereinafter, embodiments of the present invention will be described with reference to the drawings.

First Embodiment

Figure 1:
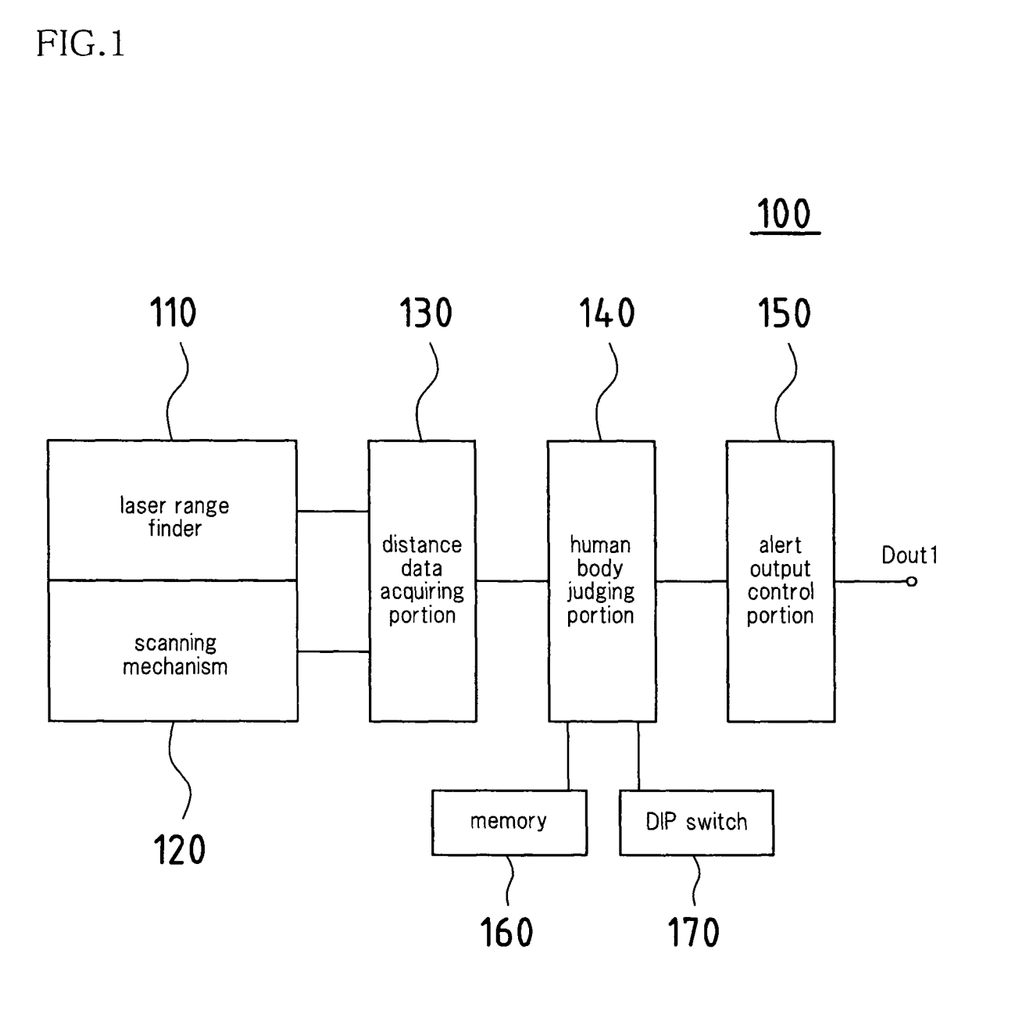
FIG. 1 is a block diagram showing the schematic configuration of a laser area sensor 100 according to a first embodiment of the present invention.
Figure 2:
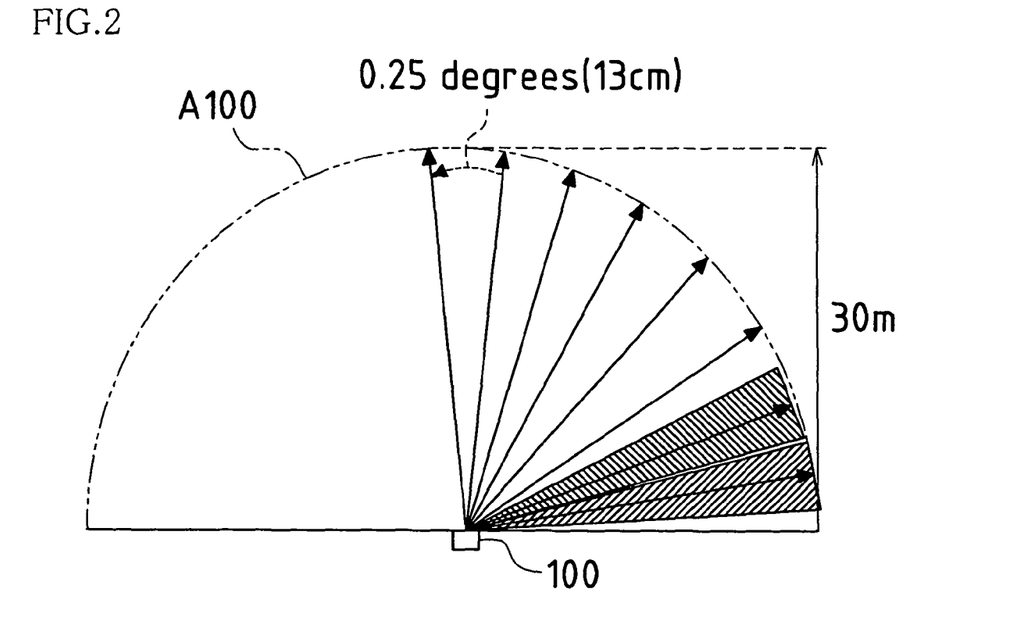
FIG. 2 is a schematic explanatory view of a detection area A100 defined by the laser area sensor 100 of FIG. 1.
Figure 3:
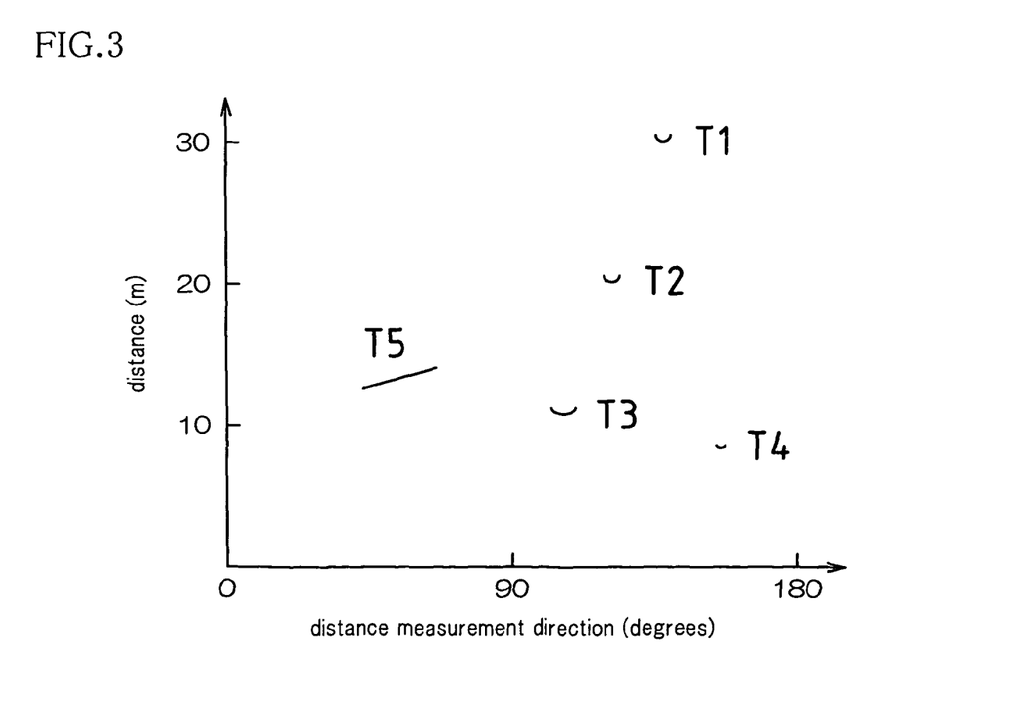
FIG. 3 is an explanatory graph showing an example of distance data acquired by the laser area sensor 100 of FIG. 1.

FIG. 1 is a block diagram showing the schematic configuration of a laser area sensor 100 according to a first embodiment of the present invention. FIG. 2 is a schematic explanatory view of a detection area defined by the laser area sensor 100. FIG. 3 is an explanatory graph showing an example of distance data acquired by the laser area sensor 100. In FIG. 2, the interval between adjacent distance measurement directions is shown much wider than the actual interval, for the sake of explanation.

As shown in FIG. 1, the laser area sensor 100 includes a laser range finder 110, a scanning mechanism 120, a distance data acquiring portion 130, a human body judging portion 140, an alert output control portion 150, a memory 160, and a DIP switch 170.

The laser range finder 110 emits pulsed laser light, and precisely measures an extremely short period of time for reflected light to return from an object that is present in a laser light emitting direction, thereby accurately measuring the distance to that object. Examples of a light-emitting element of laser light in the laser range finder 110 include a semiconductor laser diode (LD). Examples of a light-receiving element include an avalanche photodiode (APD). It is desirable to arrange a dedicated hardware circuit and the like, for example, for performing drive control of the light-emitting element and for measuring a period of time for reflected light to return. Laser range finders usually can precisely measure a considerably long distance, for example, several tens of meters at the maximum and even a much longer distance in some cases, but the maximum detection distance of this laser range finder 110 is set to 30 m.

The scanning mechanism 120 can rotate due to an embedded motor (not shown) or the like, and is mechanically connected to at least part of the laser range finder 110 so that a direction (angle) in which the laser range finder 110 measures distance can be changed. For example, a configuration is conceivable in which only an optical system portion in the laser range finder 110 is rotated, but other configurations, for example, in which the entire laser range finder 110 is rotated also can be adopted. When the scanning mechanism 120 rotates at a certain speed in a predetermined direction, the direction in which the laser range finder 110 measures distance changes in conjunction with this rotation.

The distance data acquiring portion 130 defines a detection area A100 as shown in FIG. 2 and acquires distance data in each direction at predetermined angle intervals in the detection area A100 every predetermined period of time in a time-series manner, by periodically causing the laser range finder 110 to perform measurement while causing the scanning mechanism 120 to change the measurement direction.

For example, if a scanning period T of the scanning mechanism 120 is 50 ms (scanning is performed 20 times a second), distance is measured by emitting pulsed laser light in a range of 180 degrees, which is half of one rotation, the pulse width of pulsed laser light is 34 ns, and the light-emitting period is 34.7 μs, then distance can be measured 720 times in a range of 180 degrees. In this case, the angle interval in the distance measurement is 0.25 degrees, which corresponds to a length as small as approximately 13 cm even 30 m away as shown in FIG. 2, and thus the spatial resolution in the detection area A100 is considerably high. Thus, it is possible to considerably accurately identify the position, the size, the shape, and the like of an object based on the distance data acquired by the distance data acquiring portion 130, thereby judging, for example, whether or not the object is a human body. Furthermore, even in a case where a plurality of human bodies are present in the detection area A100, the human bodies also can be individually identified. This sort of distance data can be obtained every 50 ms, which is the scanning period T. It should be noted that values shown herein are merely an example.

The human body judging portion 140 first analyses the distance data acquired by the distance data acquiring portion 130, and extracts a portion that is presumed to match a human body shape from the distance data.

For example, if a human body is oriented toward the laser area sensor 100, the width of the human trunk portion corresponds to approximately three adjacent pieces of data at a distance of 30 m, assuming that the width of the human trunk portion is 40 cm because it is approximately several tens of centimeters. The shorter the distance is, the narrower the width between adjacent pieces of data becomes. For example, if the distance is 20 m, the width is approximately 8.8 cm. If the distance is 10 m, the width is approximately 4.4 cm. At that time, the number of adjacent pieces of data corresponding to the same actual width increases, and thus, for example, if the distance is 10 m, a width of 40 cm corresponds to approximately nine adjacent pieces of data.

It will be appreciated that if a human body is not oriented toward the laser area sensor 100, but oriented in an oblique or lateral direction, the width that appears in the distance data is narrower. Furthermore, since a human body has a gentle curve, a portion closer to the center of adjacent pieces of data corresponding to the human body is to have a slightly shorter distance. A human body is to be expressed as a gentle curve protruding downward with a certain width as shown in T1, T2, and T3 in FIG. 3. If this sort of portion is present in the distance data, it is judged that this portion has a possibility of being a human body.

If the width is too narrow as shown in T4, or the width is too wide and the shape is linear as shown in T5, it is clearly judged that these portions are not a human body.

The distance data is acquired by the distance data acquiring portion 130 in a time-series manner. Thus, how a portion judged to have a possibility of being a human body in the distance data changes in subsequent pieces of distance data, that is, moving distance is obtained. Furthermore, moving speed and the like are calculated based on the moving distance, and thus a moving status is determined. Since there is a limitation in the moving speed of a human body, if the moving distance or moving speed is extremely high, it is judged that the object has a high possibility of not being a human body. Also, for example, if the movement locus is significantly discontinuous, it is judged that the object has a high possibility of not being a human body. It is also possible to judge whether the object is an intruder for which surveillance has to be exercised, or a passer-by merely walking in an area near the boundary of the detection area A100, also taking other factors such as movement direction into consideration. Comprehensively considering the above-described judgments and the like, it is judged whether or not a human body for which surveillance has to be exercised is present.

Even if an object at a distance of greater than 30 m is detected, this object is outside the detection area A100, and thus it is not judged as described above whether or not this object is a human body. However, the configuration is not limited to this.

The human body judging portion 140, if necessary, stores various types of information and the like in the memory 160 and refers to various types of information and the like stored in the memory 160. The DIP switch 170 is disposed so that a method and the like for the human body judging portion 140 to perform human body judgment can be switched manually from the outside, if necessary.

When the human body judging portion 140 judges that a human body is present, the alert output control portion 150 outputs an alert signal Dout1.

The distance data acquiring portion 130, the human body judging portion 140, the alert output control portion 150, the memory 160, and the like are preferably constituted, for example, by device-embedded one-chip microcomputers by way of software processing. The above-described judgment processing and the like can be realized with a pattern matching technique or the like. Accordingly, one-chip microcomputers with comparatively low cost can be used, and thus a contribution can be made to lowering the cost of the entire laser area sensor 100. Here, it is not absolutely necessary to use one-chip microcomputers.

Figure 4:
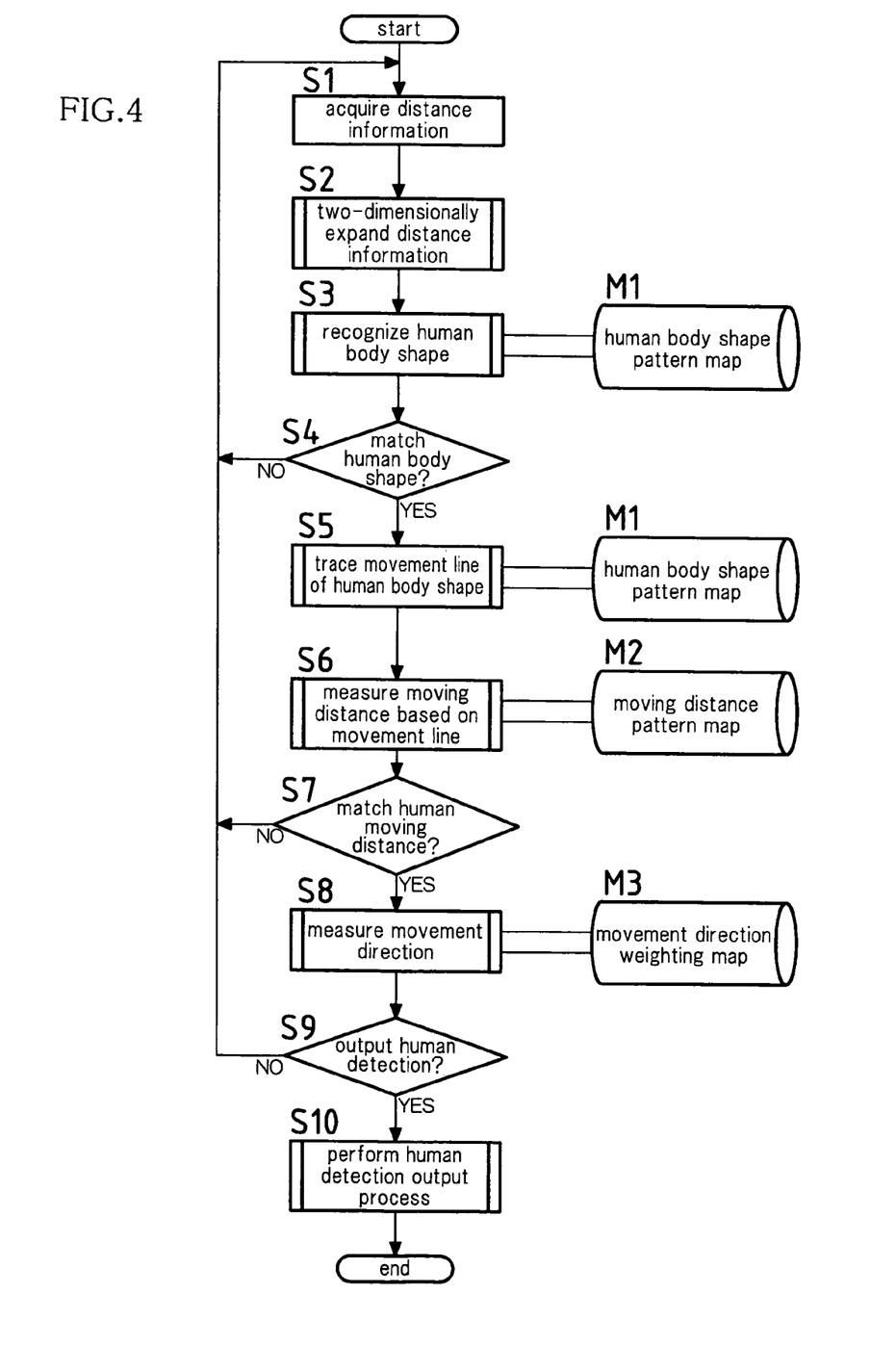
FIG. 4 is a schematic flowchart in which the laser area sensor 100 of FIG. 1 detects the presence of a human body.

FIG. 4 is a schematic flowchart in which the laser area sensor 100 detects the presence of a human body.

First, distance information is acquired by causing the laser range finder 110 to measure distance while causing the scanning mechanism 120 to change the direction in which the laser range finder 110 measures distance (step S1).

Next, the acquired distance information is converted into a two-dimensional plane (step S2), and then a shape that is presumed to be a human body is recognized with reference to a human body shape pattern map M1 in which patterns of various shapes of the human body that appear in the distance information are stored in advance (step S3). Then, if it is judged that the shape is a human body shape, the procedure proceeds to step S5, and otherwise, the procedure returns to step S1 (step S4).

If it is judged that the shape is a human body shape, a process is performed in which a movement line of the human body shape is traced with reference to the distance information acquired in a time-series manner and the human body shape pattern map M1 (step S5).

Then, the moving distance is measured based on the traced movement line (step S6), and it is judged whether or not the measured moving distance matches that of a human body with reference to a moving distance pattern map M2 in which various patterns that appear as the moving distance of a human body are stored in advance (step S7). As a result, if it is judged that the moving distance matches that of a human body, the procedure proceeds to step S8. Otherwise, the procedure returns to step S1.

If it is judged that the moving distance matches that of a human body, the movement direction is measured based on the traced movement line (step S8), and it is judged whether or not the movement direction matches that of a human body with reference to a movement direction weighting map M3 in which data indicating whether or not a direction in which a human body moves is a direction for exercising surveillance is stored in advance (step S9). As a result, if it is judged that the movement direction matches that of a human body, the procedure proceeds to step S10. Otherwise, the procedure returns to step S1.

If the procedure proceeds to step S10, it has been judged that the object matches a human body in view of all of the human body shape, the moving distance, and the movement direction. Thus, comprehensively considering these factors as well, it can be finally judged that the object is a human body. Accordingly, the alert signal Dout1 as the human body detection output is output from the alert output control portion 150 (step S10).

According to the above-described configuration of the first embodiment, the spatial resolution in the detection area A100 can be considerably high, and the distance data is acquired in a time-series manner. Thus, it is possible to considerably accurately identify the position, the size, the shape, and the like of an object based on the distance data, thereby judging, for example, whether or not the object is a human body.

Furthermore, even in a case where a plurality of human bodies are present in the detection area A100, the human bodies also can be individually identified.

Second Embodiment

Figure 5:
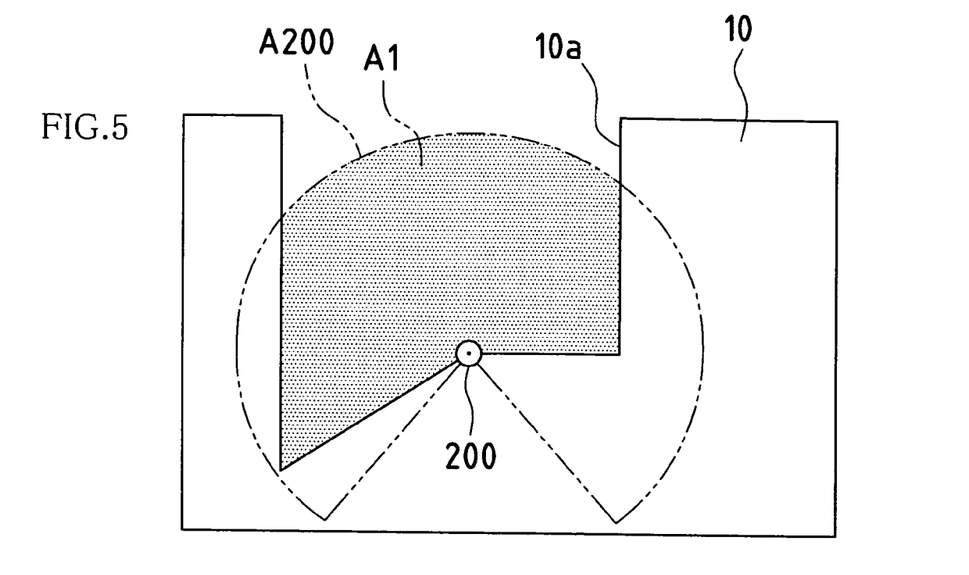
FIG. 5 is a schematic explanatory view of a normal detection area A1 in a case where a laser area sensor 200 according to a second embodiment of the present invention is installed on a building wall face 10a in order to exercise surveillance over an area enclosed on three sides by a building 10 having a slightly atypical shape.
Figure 6:
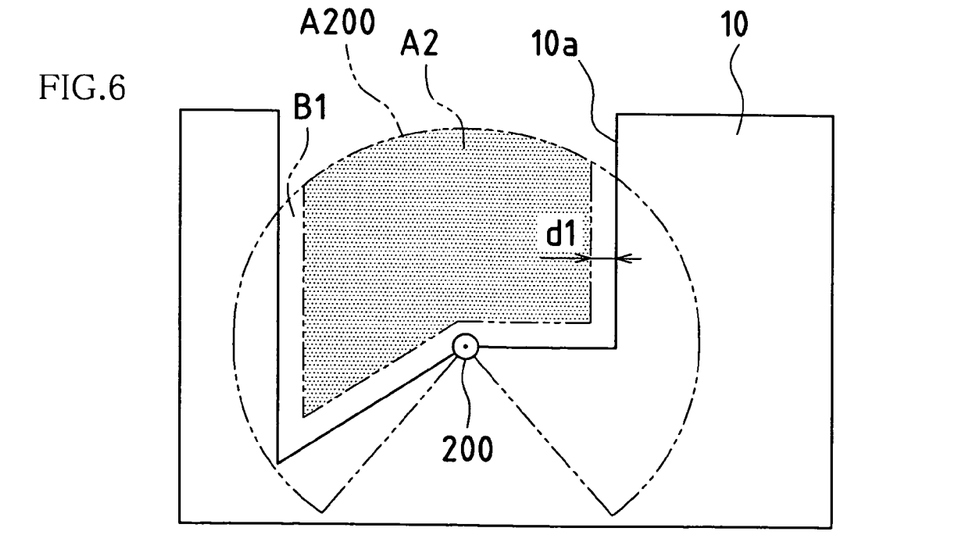
FIG. 6 is a schematic explanatory view of an erroneous operation preventing detection area A2 in a case where the laser area sensor 200 of FIG. 5 is turned to a mode for preventing erroneous operations in the vicinity of the wall face.

FIG. 5 is a schematic explanatory view of a normal detection area A1 in a case where a laser area sensor 200 according to a second embodiment of the present invention is installed on a building wall face 10*a* in order to exercise surveillance over an area enclosed on three sides by a building 10 having a slightly atypical shape. FIG. 6 is a schematic explanatory view of an erroneous operation preventing detection area A2 in a case where the laser area sensor 200 is turned to a mode for preventing erroneous operations in the vicinity of the wall face. The configuration and the like of the laser area sensor 200 itself are substantially similar to those of the laser area sensor in the first embodiment, and thus different points will be mainly described below.

As described in the first embodiment, the laser area sensor 200 acquires distance data in each direction at predetermined angle intervals in a detection area having a radius of several to several tens of meters centered about the installation location every predetermined period of time in a time-series manner, and comprehensively judges whether or not a human body is present in the detection area based on the thus acquired distance data.

If the laser area sensor 200 can scan the vicinity in a range of, for example, 280 degrees, the original detection area is to be in the shape of a sector in which the radius is the maximum detectable distance and the central angle is 280 degrees (an area A200 enclosed by the dashed double dotted line in FIG. 5). However, in the case where the laser area sensor 200 is installed substantially in the middle of the building wall face 10*a* as shown in FIG. 5, laser light is physically blocked by the building wall face 10*a* or the like depending on the distance measurement direction, and thus the maximum detection distance is substantially limited. Accordingly, the detection area actually becomes the detection area A1 as indicated by the shaded area in FIG. 5.

Here, if there are objects such as trees or hedges in a portion where the boundary of the detection area A1 is determined not by the maximum detection distance but by the building wall face 10*a*, when these objects sway in the wind or the like, the distance data acquired by the laser area sensor 200 may change in a small range in a time-series manner. Thus, data that seems to be abnormal may be mixed in with the distance data, or it may be erroneously judged that a human body is present.

Thus, it is recognized in advance that a wall face or the like is present in a direction in which the normal measurement distance is always a constant distance shorter than the maximum detection distance of the laser area sensor 200 itself, and this information is stored as the information of the actual detection area A1. If necessary, the erroneous operation preventing detection area A2 also can be selected in which a position that is inward by a predetermined distance d1 (e.g., several tens of centimeters in a direction perpendicular to the wall face or the like) from each portion recognized in advance as the wall face or the like is taken as a new boundary as shown in FIG. 6, by switching the mode, for example, from a normal surveillance mode to an erroneous operation preventing mode using an operation member such as a switch. In other words, the erroneous operation preventing detection area A2 refers to an area obtained by excluding an elongated band-shaped area B1 that extends along the wall face or the like recognized in advance and whose width is the predetermined distance d1, from the detection area A1.

Here, this sort of change in the boundary of the detection area cannot be realized simply by changing the maximum detection distance in each direction. However, since the laser area sensor 200 has recognized the position of the wall face or the like in the detection area A1 as distance data in a polar coordinate system, and thus this distance data may be converted into distance data of a rectangular coordinate system, and then it may be judged whether or not the position is inside or outside the erroneous operation preventing detection area A2.

Furthermore, if there is a window on part of the building wall face 10a, and laser light can pass through the window, there may be portions where the obtained constant distance is always inconsistent with that of the surrounding portions although it is recognized by the laser area sensor 200 that the wall face or the like is continuously present. Thus, if the distance obtained in an extremely narrow portion in a region recognized as a wall face or the like is inconsistent with that of the surrounding portions, data obtained by interpolation based on the distance data of the surrounding portions may be stored as the information of the detection area A1.

Furthermore, the mode can be automatically switched from the normal surveillance mode to the erroneous operation preventing mode. For example, the information of the detection area A1 may be stored in an installation operation mode of the laser area sensor 200, and the mode may be set to the erroneous operation preventing mode during a normal operation.

According to the above-described configuration of the second embodiment, if there are objects such as trees or hedges in a portion where the boundary of the detection area A1 is determined not by the maximum detection distance but by the building wall face 10a or the like, even when these objects sway in the wind or the like, a situation in which it is erroneously judged that a human body is present is prevented as much as possible, and thus the reliability in detecting a human body is improved.

If area information or the like at the time of exercising surveillance is different based on information of the detection area A1, the erroneous operation preventing detection area A2, and the like, it may be judged according to the different ratio or degree, for example, that an area mask has been provided or a surveillance range has been changed, and an alert signal may be output.

Regarding setting of a surveillance area, if an input using an operation portion such as a switch or an input to start exercise of surveillance from the outside is obtained, or if a trigger to start exercise of surveillance with a timer or the like is provided, the surveillance area is preferably set immediately after or at a certain period of time after starting exercise of surveillance. Then, with an input using an operation portion such as a switch or in an automatic manner, surveillance may be exercised in a surveillance area stored as a surveillance mode. If exercise of surveillance is started with an external or internal timer, based on the comparison between the current area and the previously stored area, information may be output according to the degree of a change, as a surveillance area changing output, or as a masking alarm output if changed areas have close distances from each other.

Regarding a stored surveillance area, if an input to start exercise of surveillance from the outside or a trigger to start exercise of surveillance with a timer or the like is not provided, the surveillance state continues, and thus the current area may be different from the stored surveillance area, for example, due to a change in the layout inside the surveillance area or the parking of cars. In this case, if a condition that there is almost no change in an area state different from the stored area state for a certain period of time or longer or at a certain ratio is satisfied, a condition that the degree of a change in the area in a unit time is in a certain range or lower is satisfied, or the both conditions are satisfied, it is judged that the surveillance area has been changed, and stored information regarding the surveillance area is changed. Simultaneously, an output indicating that the stored surveillance area has been changed may be externally output. Furthermore, if the ratio of information of areas in a close distance is larger in stored area information after change than that before change, or if distance information within a constant distance is recognized by a sensor, it may be judged that an area mask has been provided, and information may be provided, for example, as an external output.

Third Embodiment

In the second embodiment described above, the information of the actual detection area A1 at the installation location is stored, and, if necessary, the erroneous operation preventing detection area A2 also can be selected in which a position that is inward by the predetermined distance d1 from each portion recognized in advance as a wall face or the like is taken as a new boundary. However, an arbitrary surveillance area cannot be set. Thus, a laser area sensor in which an arbitrary surveillance area can be easily set according to factors such as an actual installation location and a surveillance purpose will be described below as a third embodiment.

Figure 7:
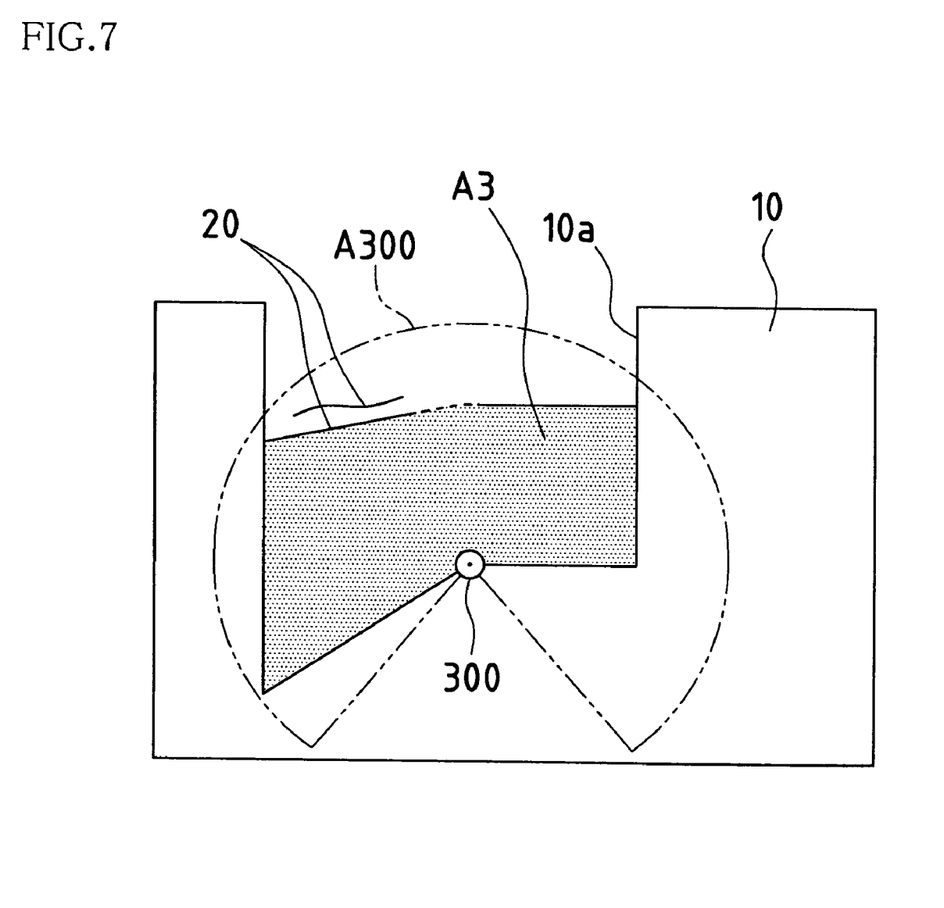
FIG. 7 is a schematic explanatory view of a method for setting an arbitrary surveillance area A3 in a case where a laser area sensor 300 according to a third embodiment of the present invention is installed on the building wall face 10a in order to exercise surveillance over an area enclosed on three sides by the building 10 having a slightly atypical shape.

FIG. 7 is a schematic explanatory view of a method for setting an arbitrary surveillance area A3 in a case where a laser area sensor 300 according to a third embodiment of the present invention is installed on the building wall face 10a in order to exercise surveillance over an area enclosed on three sides by the building 10 having a slightly atypical shape.

Also in the case of the laser area sensor 300, the original detection area is to be in the shape of a sector in which the radius is the maximum detectable distance (an area A300 enclosed by the dashed double dotted line in FIG. 7). However, in the laser area sensor 300, it is recognized in advance that a wall face or the like is present in a direction in which the measurement distance is always a constant distance shorter than the maximum detection distance of the laser area sensor 300 itself, and this information is stored as the information of the actual detection area. If necessary, the mode can be switched to a surveillance area setting mode for arbitrarily setting a surveillance area.

In the surveillance area setting mode, the laser area sensor 300 judges whether or not a human body is present in the actual detection area, and stores a movement line 20 of the human body as a locus while monitoring the subsequent movement of the human body. If the movement line 20 is partially cut and discontinuous, the line may be connected by interpolation processing. If a plurality of movement lines 20 with different detection distances are observed in the same direction and in the same scanning range, the movement line 20 with a closer distance is preferably stored. The reason for this is that unintended storage, for example, due to accidental detection of a movement of an irrelevant person can be prevented. When an area between the movement line 20 as the thus stored movement locus and the laser area sensor 300 can be regarded as the surveillance area A3 in the normal surveillance mode, an arbitrary surveillance area can be set.

Figure 8:
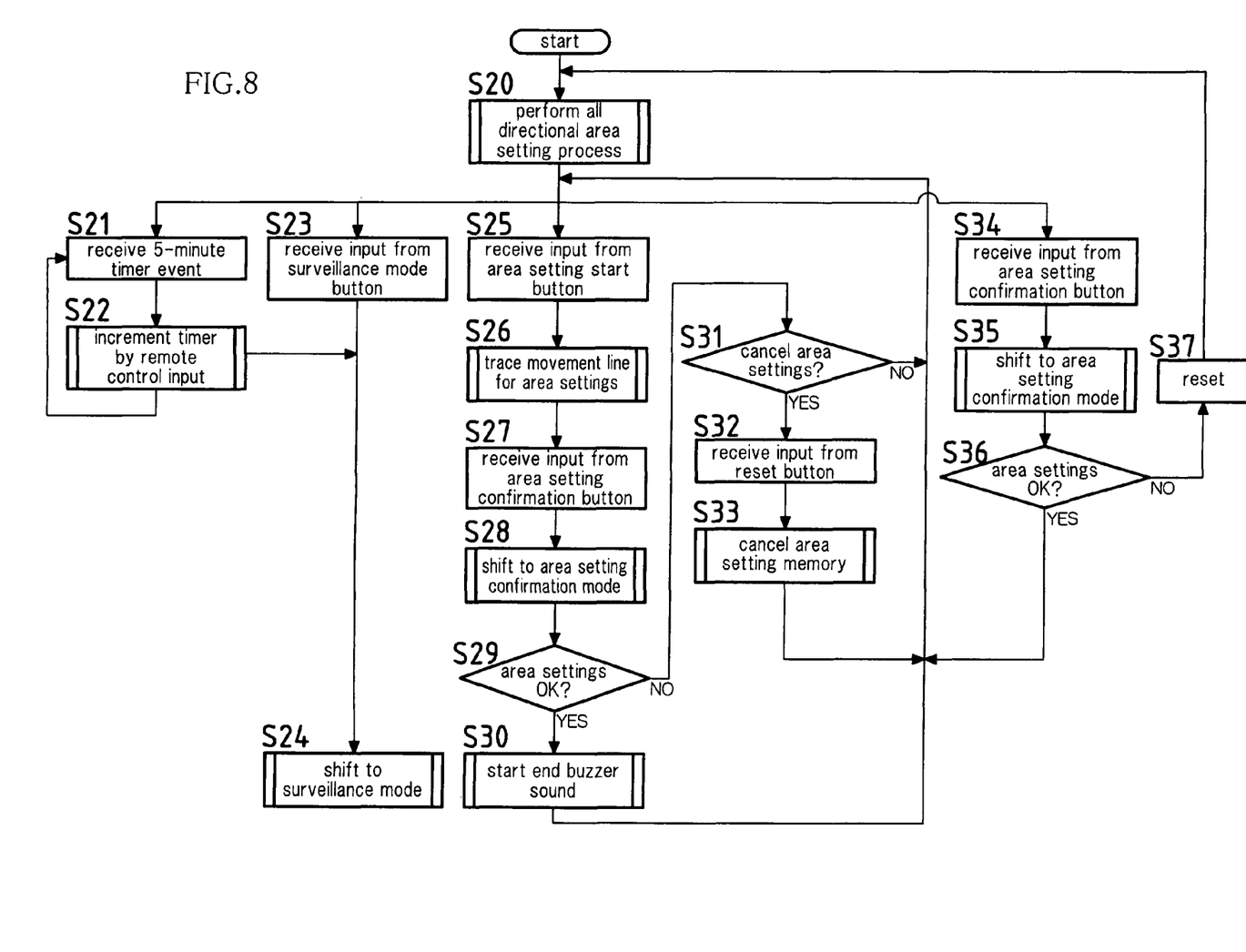
FIG. 8 is a schematic flowchart in which the laser area sensor 300 of FIG. 7 sets an arbitrary surveillance area.

FIG. 8 is a schematic flowchart in which the laser area sensor 300 sets an arbitrary surveillance area.

First, a setting process regarding all directional areas is performed (step S20). Then, the procedure shifts to the standby state until it proceeds to any one of steps S21, S23, S25, and S34.

If an event by a 5-minute timer occurs (step S21), the timer is incremented by a remote control input, and the procedure proceeds to step S24, where the mode is shifted to a normal surveillance mode.

If there is an input from a surveillance mode button (step S23), the procedure directly proceeds to step S24, where the mode is shifted to a normal surveillance mode.

If there is an input from an area setting start button (step S25), it is judged whether or not a human body is present and the movement line of the human body is traced for area settings. If there is an input from an area setting confirmation button (step S27), the procedure shifts to an area setting confirmation mode (step S28). The area settings are confirmed (step S29), and if there is no particular problem, an end buzzer sound indicating that the area settings end is started (step S30), and the procedure returns to the standby state. If there is any problem in area settings, it is confirmed whether or not to cancel the area settings obtained up till then (step S31). If there is an input from a reset button for cancellation (step S32), the changed content and the like of the area setting memory are returned to the original state (step S33), and the procedure returns to the standby state.

In the standby state, if there is an input from an area setting confirmation button (step S34), the procedure shifts to an area setting confirmation mode (step S35). The area settings are confirmed (step S36), and if there is no particular problem, the procedure returns to the standby state. If there is any problem in area settings, the laser area sensor 300 is reset (step S36), and the procedure returns to step S20.

According to the above-described configuration of the third embodiment, an arbitrary surveillance area can be easily set according to factors such as an actual installation location and a surveillance purpose. Thus, the reliability in detecting a human body can be improved. The third embodiment may further include the same function as that of the second embodiment.

If area information or the like at the time of exercising surveillance is different based on information of the detection area A300, the detection area A3, and the like, it may be judged according to the different ratio or degree, for example, that an area mask has been provided or a surveillance range has been changed, and an alert signal may be output.

Other Embodiments

In the second embodiment, a human body can be detected selectively in the erroneous operation preventing detection area A2 that is an area obtained by excluding the elongated band-shaped area B1 that extends along a wall face or the like recognized in advance and whose width is the predetermined distance d1, from the normal detection area A1. However, depending on the actual installation location, surveillance purpose, and the like, it may be more suitable to detect a human body in an area that extends along a wall face or the like.

Figure 9:
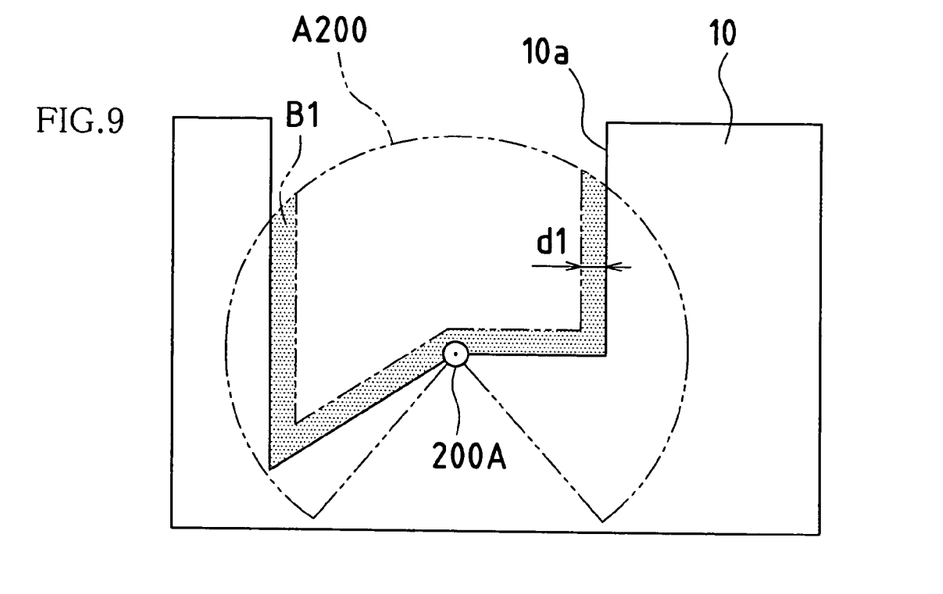
FIG. 9 is a schematic explanatory view of a detection area in a case where a laser area sensor 200A according to a first modified example of the second embodiment of the present invention is installed on the building wall face 10a in order to exercise surveillance over an area enclosed on three sides by the building 10 having a slightly atypical shape.

FIG. 9 is a schematic explanatory view of a detection area in a case where a laser area sensor 200A according to a first modified example of the second embodiment of the present invention is installed on the building wall face 10a in order to exercise surveillance over an area enclosed on three sides by the building 10 having a slightly atypical shape.

That is to say, in this case, a human body is detected only in the band-shaped area B1 described above. Regarding judgment of whether or not an object is a human body, if the distance data has a change in which the object cuts across the band-shaped area B1, it may be judged that the object is a human body.

Figure 10:
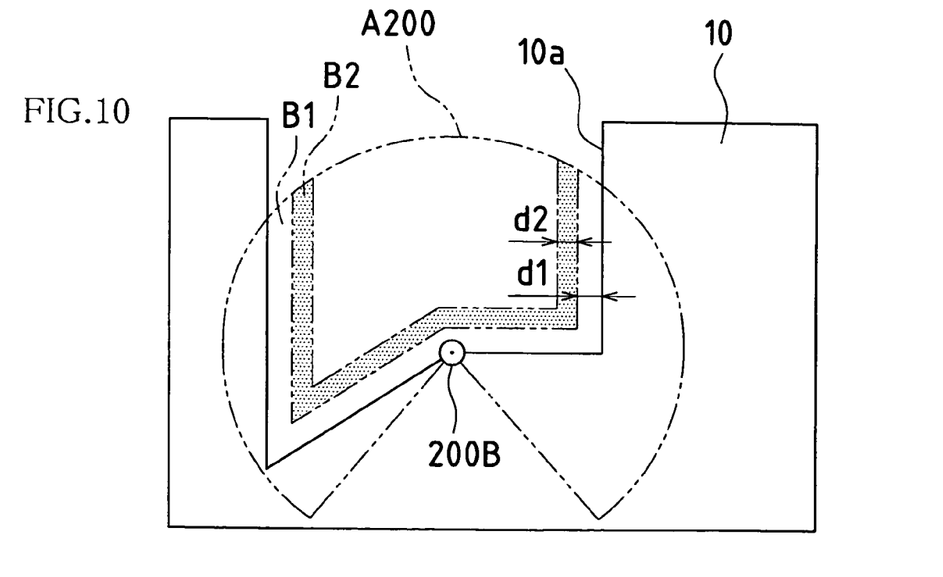
FIG. 10 is a schematic explanatory view of a detection area in a case where a laser area sensor 200B according to a second modified example of the second embodiment of the present invention is installed on the building wall face 10a in order to exercise surveillance over an area enclosed on three sides by the building 10 having a slightly atypical shape.

FIG. 10 is a schematic explanatory view of a detection area in a case where a laser area sensor 200B according to a second modified example of the second embodiment of the present invention is installed on the building wall face 10a in order to exercise surveillance over an area enclosed on three sides by the building 10 having a slightly atypical shape.

In this second modified example, in order to suppress erroneous detection due to objects such as trees or hedges in the vicinity of the building wall face 10a as considered in the second embodiment, a human body is detected only in an elongated band-shaped area B2 that is positioned next to the band-shaped area B1 and whose width is a predetermined distance d2 (e.g., several tens of centimeters). Regarding judgment of whether or not an object is a human body, as in the first modified example, if the distance data has a change in which the object cuts across the band-shaped area B2, it may be judged that the object is a human body.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A laser area sensor, comprising:
    a laser range finder that emits laser light, and measures a distance to an object that is present in a laser light emitting direction based on a period of time for light reflected by the object to return;
    a scanning mechanism portion that changes a measurement direction of the laser range finder;
    a distance information acquiring portion that defines a detection area and acquires distance information in each direction in the detection area in a time-series manner, by periodically causing the laser range finder to perform measurement while causing the scanning mechanism portion to change the measurement direction;
    a human body judging portion that extracts a portion that is presumed to correspond to a human body, from among the distance information acquired by the distance information acquiring portion, and judges whether or not the extracted portion matches a human body based on a time-series moving status of the extracted portion; and
    a human body detection signal output portion that outputs a human body detection signal when the human body judging portion judges that a human body is present.

2. The laser area sensor according to claim 1, further comprising:
    an area storage portion in which, with respect to a direction in which a normal measurement distance is a constant distance shorter than the maximum detection distance of the laser range finder, the constant distance is recognized to correspond to a detection area boundary face and stored as detection area information,
    wherein the human body judging portion has a first operation mode in which judgment is performed regarding a human body in a first region that is determined by the shorter distance of the maximum detection distance and the distance to the detection area boundary face in each direction, based on the detection area information stored in the area storage portion.

3. The laser area sensor according to claim 2, wherein the human body judging portion has a second operation mode in which judgment is performed regarding a human body in a second region obtained by excluding a first band-shaped area that extends along the detection area boundary face and has a first predetermined width, from the first region, based on the detection area information stored in the area storage portion.

4. The laser area sensor according to claim 3, further comprising:
a switching portion that switches the mode between the first operation mode and the second operation mode.

5. The laser area sensor according to claim 3, wherein the first operation mode and the second operation mode are automatically switched.

6. The laser area sensor according to claim 2, wherein the human body judging portion has a third operation mode in which judgment is performed regarding a human body in a first band-shaped area that extends along the detection area boundary face and has a first predetermined width, based on the detection area information stored in the area storage portion.

7. The laser area sensor according to claim 2, wherein the human body judging portion has a fourth operation mode in which judgment is performed regarding a human body in a second band-shaped area that is positioned farther than and next to a first band-shaped area and has a second predetermined width, based on the detection area information stored in the area storage portion, the first band-shaped area extending along the detection area boundary face and having a first predetermined width.

8. The laser area sensor according to claim 2, wherein the human body judging portion has a movement line storing operation mode in which judgment is performed regarding a human body in the first region and a movement line of an object judged to be a human body is stored as a locus, and a fifth operation mode in which judgment is performed regarding a human body in a third region that is determined by a distance to the movement line stored in the movement line storing operation mode in each direction.

9. The laser area sensor according to claim 8, wherein if there is a discontinuous portion in the movement line, the human body judging portion completes the discontinuous portion by interpolation processing, and stores the movement line.

10. The laser area sensor according to claim 8, wherein, if a plurality of movement lines are present in the same direction, the human body judging portion stores a movement line with a closer distance in priority to the others.

* * * * *